(12) United States Patent
Duvnjak

(10) Patent No.: US 7,782,635 B2
(45) Date of Patent: *Aug. 24, 2010

(54) DC CONVERTER WITH INDEPENDENTLY CONTROLLED OUTPUTS

(75) Inventor: Rajko Duvnjak, Kanata (CA)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/365,038

(22) Filed: Feb. 3, 2009

(65) Prior Publication Data

US 2009/0134702 A1    May 28, 2009

Related U.S. Application Data

(63) Continuation of application No. 11/589,738, filed on Oct. 31, 2006, now Pat. No. 7,505,288.

(60) Provisional application No. 60/740,271, filed on Nov. 29, 2005.

(51) Int. Cl.
    *H02M 3/335* (2006.01)
(52) U.S. Cl. .................... 363/21.18; 363/21.1
(58) Field of Classification Search .............. 363/21.04, 363/21.1, 21.12, 21.18
    See application file for complete search history.

(56) References Cited

U.S. PATENT DOCUMENTS

| | | | |
|---|---|---|---|
| 4,230,981 A | 10/1980 | Rambold | |
| 5,862,042 A | 1/1999 | Jiang | |
| 5,862,044 A | 1/1999 | Shioya et al. | |
| 6,058,026 A | 5/2000 | Rozman | |
| 6,211,579 B1 | 4/2001 | Blair | |
| 6,522,110 B1 | 2/2003 | Ivanov | |
| 6,552,917 B1 | 4/2003 | Bourdillon | |
| 6,606,257 B2 | 8/2003 | Bourdillon | |
| 6,977,362 B2 | 12/2005 | Ohishi et al. | |
| 7,505,288 B2 * | 3/2009 | Duvnjak | 363/21.18 |
| 2008/0062725 A1 | 3/2008 | Yang | |
| 2008/0062726 A1 | 3/2008 | Peng et al. | |

OTHER PUBLICATIONS

Wells, E. et al., "Low Power Boost Converter for Portable Applications," Texas Instruments, Inc., 2001, pp. 2-1-2-8.
"NCP4326: Secondary Controller for Multi-Output Quasi-Resonant Switchmode Power Supplies," ON Semiconductor, Semiconductor Components Industries, LLC, Rev. 1, Sep. 2005, pp. 1-29.

* cited by examiner

*Primary Examiner*—Jeffrey L Sterrett
(74) *Attorney, Agent, or Firm*—Blakely Sokoloff Taylor & Zafman, LLP

(57) ABSTRACT

A DC converter comprises a single primary circuit which is coupled to each of a plurality of output circuits in respective time periods, the coupling being provided by switching in the output circuits. Each output circuit produces a respective output voltage and a respective feedback signal which is coupled as a control signal to the primary circuit during the respective time periods, so that each output voltage is regulated substantially independently of each other output voltage. The time periods for the different output circuits can be equal or different, and can be dynamically changed depending on error voltages of the output circuits.

9 Claims, 4 Drawing Sheets

DC CONVERTER WITH INDEPENDENTLY CONTROLLED OUTPUTS

CROSS-REFERENCE TO RELATED APPLICATIONS

The present application is a continuation of U.S. patent application Ser. No. 11/589,738, entitled "DC CONVERTER WITH INDEPENDENTLY CONTROLLED OUTPUTS," and filed Oct. 31, 2006, which claims the benefit of U.S. Provisional Application Ser. No. 60/740,271, filed Nov. 29, 2005. U.S. patent application Ser. Nos. 11/589,738 and 60/740,271 are hereby incorporated by reference.

FIELD OF INVENTION

This invention relates to a DC converter with a plurality of independently controlled or regulated outputs. DC converters are also referred to by other names such as DC-DC converters, DC or DC-to-DC regulators, switch mode regulators, converters, power converters, or power supplies, and so on. The term "DC converter" or simply "converter" is used herein to include all such terms. The plurality of outputs of the converter are also referred to as multiple outputs, i.e. two or more outputs.

BACKGROUND

DC converters can be used in many different applications to provide controlled or regulated voltages.

One such application, in the context of which the present invention is described by way of example below but to which the invention is not in any way limited, is for producing three relatively high voltages, referred to as voltages VSET, VERASE, and VSCAN, which are used respectively to set, erase, and scan a plasma display panel (PDP) in equipment such as a television set. For example the voltage VSET may be between 180 and 215 volts, the voltage VERASE may be between 70 and 120 volts, and the voltage VSCAN may be between −160 and −230 volts. Power levels associated with these voltages depend on the type of PDP but may typically be in a range of 6 watts to about 30 watts for each voltage, with a combined maximum power of about 30 to about 60 watts.

A known PDP power supply typically generates other secondary voltages which are isolated from a rectified a.c. supply used for powering the equipment. The relatively high voltages can be generated from one or more of these other secondary voltages; consequently isolation between the inputs and outputs of DC converters producing these relatively high voltages may not be required.

Each of these relatively high voltages is required to be independently adjustable within a relatively wide range, with the adjustments being in accordance with requirements and characteristics of the individual PDP assembled in an individual item of equipment. Thus for television sets, the adjustment of each of these voltages is carried out during assembly of each individual television set.

The requirement to adjust each of these voltages independently prevents the use, for producing and regulating these voltages, of a single multiple-output DC converter in which one output voltage is regulated by controlling a primary switch of the converter and the other output voltages are regulated by means of cross coupling, using either coupled windings in a flyback converter or coupled inductors in a forward converter.

The power levels associated with these voltages are too high for it to be practical to regulate one voltage using a primary switch of a DC converter and to use linear regulators for post regulation for the other voltages. In addition, the relatively high voltages make the use of buck type regulators complicated and not cost effective, and boost type converters are not practical due to the lack of a current limit.

A known approach to providing and regulating these three relatively high voltages is to use three completely independent flyback converters. For high volume production and for a low cost driven market, such as is the case for television sets, this approach is not very cost effective.

It is known to provide a flyback converter with a plurality of outputs which can be derived from one or more secondary windings of a transformer of the converter, and it is known to seek to regulate such multiple outputs independently.

For example, Bourdillon U.S. Pat. No. 6,552,917 issued Apr. 23, 2003 and entitled "System And Method For Regulating Multiple Outputs In A DC-DC Converter" discloses a multiple output flyback converter in which in each switching cycle a primary switch is first closed to store energy in a transformer, and then a plurality of secondary switches associated with respective outputs are closed in sequence to supply energy from the transformer to respective outputs. Fast feedback loop controllers in the output circuits control the switching of the secondary switches, and a slow feedback loop controller controls the switching of the primary switch.

In this known converter the fast secondary feedback loops only compensate for small load changes of the order of 1 to 5 percent, and the primary switch feedback loop operates slowly. Such a converter does not provide independent regulation of the outputs for large and rapid load changes, because the energy supplied to the transformer in each switching cycle is shared among the plurality of outputs.

Accordingly, such a converter is not suited to producing and regulating the relatively high voltages of a PDP, for which it has been found that the loads can change rapidly by large amounts. For example, currents associated with these voltages may include short current pulses, for example with durations of the order of 20 μs or less and peak amplitudes of the order of ten times an average output current.

Bourdillon U.S. Pat. No. 6,606,257 issued Aug. 12, 2003 and entitled "Independent Regulation Of Multiple Outputs In A Soft-Switching Multiple-Output Flyback Converter" describes another flyback converter with multiple outputs derived from one or more transformer secondary windings. Again in this case in each switching cycle first a primary switch is closed to store energy in a transformer, and then a plurality of secondary switches associated with respective outputs are closed in sequence to supply energy from the transformer to respective outputs. Thus again in this case the energy stored in the transformer in the first part of a switching cycle is shared among the outputs in the remainder of the switching cycle, so that independent regulation of the output voltages is ineffective for rapid and large changes of the output loads.

Various other DC converter or regulator arrangements, having two or more outputs with some degree of regulation, which have similar or other shortcomings or limitations, are known for example from the following references:

Jiang U.S. Pat. No. 5,862,042 issued Jan. 19, 1999 and entitled "Multiple Output DC To DC Converter", in which multiple output voltages are produced by respective output circuits which are coupled to respective input circuits all of which share a common input subcircuit for example including a switch operating at a fixed duty cycle. Each output is regulated using its own switch controlled by its own PWM (pulse width modulation) controller; the converter thus requires as many PWM controllers and associated feedback loops as there are output voltages.

Rozman U.S. Pat. No. 6,058,026 issued May 2, 2000 and entitled "Multiple Output Converter Having A Single Transformer Winding And Independent Output Regulation", in which two output voltages are provided and are regulated by two PWM controllers, one controlling a primary switching circuit and the other controlling a switch on the secondary side of a transformer.

Blair U.S. Pat. No. 6,211,579 issued Apr. 3, 2001 and entitled "Multiple Output Converter Having A Low Power Dissipation Cross Regulation Compensation Circuit", in which an adjustable impedance is provided in an output voltage path for which regulation is provided by a feedback loop, and is controlled in dependence upon sensed output voltages of other output voltage paths.

Ivanov U.S. Pat. No. 6,522,110, issued Feb. 18, 2003 and entitled "Multiple Output Switching Regulator", in which switches of a voltage regulator are controlled by a decision logic block to control the flow of current from an inductor, to which energy is supplied via a power switch, to any of two or more outputs whose voltages are monitored by error amplifiers which supply error signals to the decision logic block.

"Low Power Boost Converter For Portable Applications", by Eddy Wells and Mark Jordan, Texas Instruments Incorporated, 2001, which describes a UCC3941 synchronous boost converter as incorporating a PFM (pulsed frequency modulation) control technique and a multiplexed coil technique to generate multiple outputs from a single inductor, energy pulses stored in the inductor being time shared among the outputs in accordance with a predetermined priority scheme.

ON Semiconductor Data Sheet NCP4326, "Secondary Controller For Multi-Output Quasi-Resonant Switchmode Power Supplies", September 2005, which discloses a converter with one output voltage regulated by a primary PWM controller which controls a primary switch and one or two other output voltages regulated using secondary switches controlled by a secondary controller.

Despite these numerous approaches, a problem of independent regulation of multiple outputs of a DC converter remains, especially where there may be rapid and large changes of load currents supplied via the respective outputs. This problem can apply in various applications of converters, and is not limited to any particular application of a converter, such as for producing high voltages for a PDP as discussed above.

There is therefore a need to provide an improved DC converter with independently regulated multiple outputs.

SUMMARY OF THE INVENTION

One aspect of this invention provides a DC converter comprising: a transformer having a primary winding and one or more secondary windings; a primary switch coupled in series with the primary winding of the transformer; a control unit for turning the primary switch on, to couple a supply voltage to the primary winding, and off, in dependence upon a control signal; N output circuits each for providing a respective one of N output voltages of the converter, where N is an integer greater than one, each of the output circuits including a circuit for producing a feedback signal for regulating the respective output voltage; and a switching arrangement for coupling the output circuits each during respective time periods to a secondary winding of the transformer, and for coupling the feedback signals of the output circuits, each during the respective time periods, as the control signal to the control unit for regulating the output voltages of the output circuits.

In particular embodiments of the invention each of the N output circuits can includes components forming, with the transformer, primary switch, and control unit during the respective time periods that it is coupled to a secondary winding of the transformer, either a forward converter or a flyback converter.

For example, the components forming a forward converter can comprise two diodes, a series inductor, and an output capacitor, and the components forming a flyback converter can comprise a diode and an output capacitor, in each case arranged in known manner and with appropriate polarities of the diode(s) and secondary winding. As is known, diodes can be replaced by transistor switches as may be desired.

For a flyback converter configuration, conveniently one of the N output circuits can be coupled permanently to a secondary winding of the transformer, thereby reducing the number of output circuit switches that are required.

In particular, there can be three output circuits for producing three independently regulated output voltages determined by respective variable reference voltages to be within approximate ranges of the order of 180 to 215 volts, 70 to 120 volts, and −160 to −230 volts respectively, suitable for the voltages VSET, VERASE, and VSCAN for a PDP as described above.

The transformer can have N secondary windings with each of the N output circuits coupled during the respective time periods to a respective one of the secondary windings, or it can have one secondary winding to which each of the N output circuits is coupled during the respective time periods, or it can have a combination of such connections.

The DC converter can include a control circuit for the switching arrangement arranged to determine the respective time periods sequentially, cyclically, and equally for the N output circuits, or sequentially and cyclically with different durations for different ones of the N output circuits. Such different durations can be formed from one or more time slots different numbers of which are assigned to form the different durations, or can be determined in any other desired manner, for example using monostable stages to determine the different durations.

Furthermore, the converter can include a control circuit for monitoring error voltages of the output circuits and for determining the respective time periods in dependence upon the monitored error voltages, thereby providing a dynamic or load-dependent assignment of the respective time periods to the respective output voltages.

Another aspect of the invention provides a method of producing N output voltages, where N is an integer greater than one, comprising the steps of: coupling a single primary circuit of a DC converter to each of N output circuits of the DC converter in respective time periods, the output circuits each producing a respective one of the N output voltages; and coupling a respective feedback signal of each of the output circuits as a feedback control signal to the primary circuit of the DC converter during the respective time periods for regulating each output voltage substantially independently of each other output voltage.

Conveniently the DC converter is operated in discontinuous current mode for producing each of the N output voltages, thereby facilitating their independent regulation.

The DC converter can be a forward or a flyback converter, and the step of coupling the primary circuit to each of the N output circuits in respective time periods can comprise selectively switching each of at least N−1 of the output circuits to couple it to a secondary winding of a transformer of the DC converter.

The method preferably comprises the step of producing the respective time periods sequentially and cyclically for the N output circuits, and can produce the respective time periods equally for the N output circuits, with different durations for different ones of the N output circuits, or with durations dependent upon error voltages of the output circuits.

BRIEF DESCRIPTION OF THE DRAWINGS

The invention will be further understood from the following description by way of example with reference to the accompanying drawings, in which.

DETAILED DESCRIPTION

Figure 1:
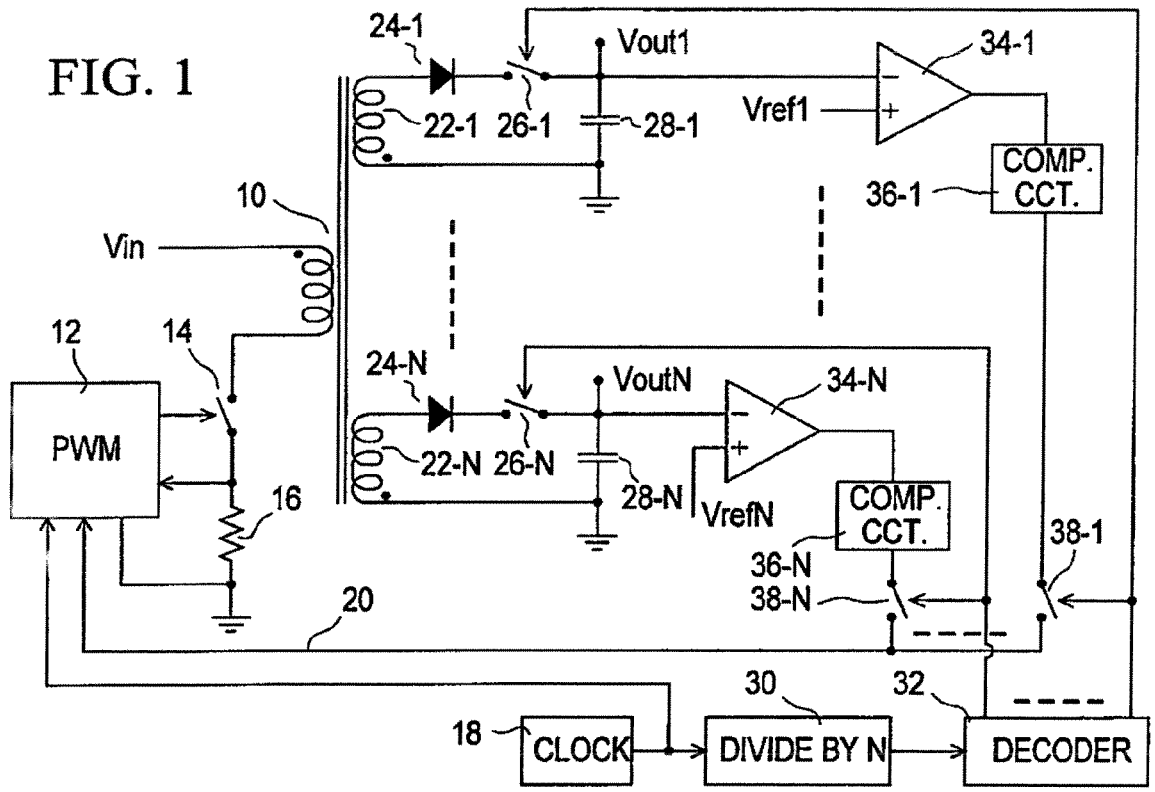
FIG. 1 schematically illustrates a multiple output flyback converter in accordance with an embodiment of this invention.

Referring to the drawings, FIG. 1 illustrates a multiple output flyback converter in accordance with an embodiment of this invention. Two output circuits of the converter are illustrated as producing output voltages Vout1 and VoutN with respect to ground or zero volts. The converter can optionally comprise other output circuits producing respective output voltages as indicated by dashed lines. Generally, the converter can produce N output voltages from N output circuits, where N is an integer greater than 1.

The converter of FIG. 1 comprises a transformer 10 having a primary winding and N secondary windings, one for each of the N output circuits. A PWM (pulse width modulator) unit 12 controls conduction times of a primary switch 14 connected in series with the primary winding of the transformer, to which a supply voltage Vin is supplied. A resistor 16 is connected between the switch 14 and ground for monitoring current through the switch 14, a junction between the resistor and the switch supplying a corresponding small voltage to the PWM unit 12. A switching frequency of the PWM unit 12 is determined by a clock signal produced by a clock source 18. The PWM unit 12 is also supplied with a feedback control signal on a line 20, as further described below.

The N secondary windings of the transformer 10, referenced 22-1 to 22-N respectively for the N output circuits, having polarities or winding senses as shown conventionally by dots adjacent the windings, are coupled via respective diodes 24-1 to 24-N and respective output selection switches 26-1 to 26-N to respective output capacitors 28-1 to 28-N at the outputs for the respective output voltages Vout1 to VoutN. The clock signal produced by the clock source 18 is supplied to a divide-by-N circuit 30, outputs of which are supplied to a 1-of-N decoder 32 having N outputs which control the N output selection switches 26-1 to 26-N, respectively. This control is such that in a first cycle of each N consecutive cycles of the clock signal the output selection switch is closed to couple the secondary winding 22-1 via the diode 24-1 and the switch 26-1 to the output capacitor 28-1, and similarly for each other output in a respective one of every N cycles, whereby the output circuits are selected cyclically in turn.

The converter of FIG. 1 also includes respective error voltage amplifiers 34-1 to 34-N, feedback compensation circuits 36-1 to 36-N, and feedback selection switches 38-1 to 38-N, for the N outputs circuits. Each feedback compensation circuit can provide any desired feedback transfer characteristic, for example it can comprise an amplifier for providing a constant gain, an integrator, and so on, and the compensation circuit of any one or more of the output circuits can optionally be omitted.

The output voltage Vout1 is connected (if necessary via scaling resistors, not shown) to an inverting (−) input of the error voltage amplifier 34-1, a non-inverting (+) input of which is supplied with a reference voltage Vref1 which represents a desired value of the output voltage Vout1. An error voltage produced at the output of the amplifier 34-1 is coupled via the feedback compensation circuit 36-1 to the feedback selection switch 38-1, which supplies the resulting feedback signal to the feedback control line 20 when the switch 38-1 is closed. The other error amplifiers, feedback compensation circuits, and feedback selection switches are similarly arranged for the other respective outputs and respective reference voltages.

The outputs of the decoder 32 control the feedback selection switches 38-1 to 38-N in the same cyclic sequence as the output selection switches 26-1 to 26-N respectively. For simplicity, FIG. 1 shows both switches for each converter output circuit being driven by the same signal, but this need not be the case. Instead, for example, control signals for closing the feedback selection signals may be delayed in relation to control signals for closing the corresponding output selection switches, in order to compensate for characteristics of the PWM and switching arrangements, including for example switch driver delays and settling times.

The converter of FIG. 1 may include other features, e.g. snubbers to deal with parasitic elements, that are not particularly relevant to the invention and accordingly are not shown; the same applies to other figures of the drawings.

Figure 2:
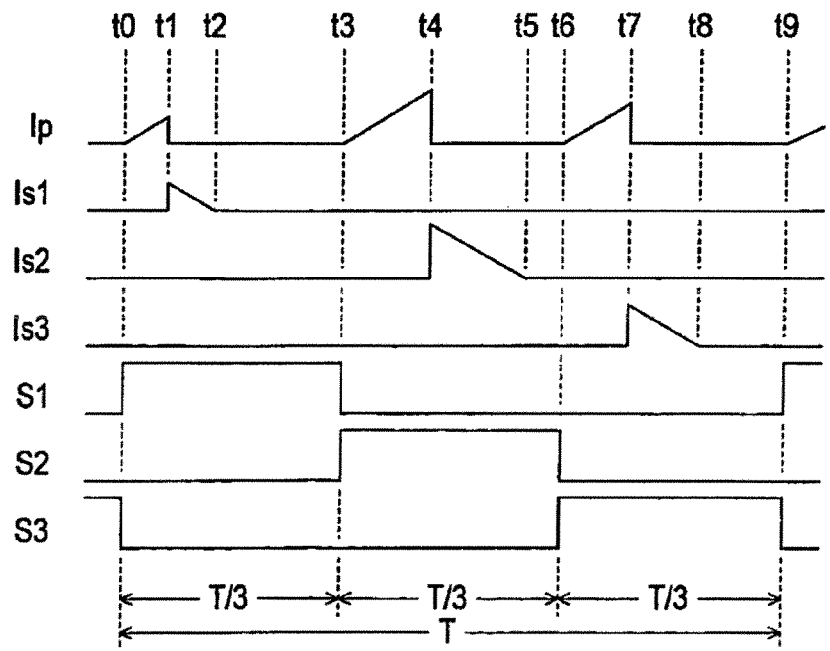
FIG. 2 is a timing diagram illustrating operation of a multiple output flyback converter in accordance with an embodiment of this invention.

The operation of the converter of FIG. 1 is described below with additional reference to FIG. 2 for the case of N=3, i.e. for a converter providing three output voltages. FIG. 2 is a timing diagram showing, for N=3 consecutive cycles of the clock signal (not shown), switching waveforms S1, S2, and S3 for the output selection switches 26-1 to 26-N respectively and also for the feedback selection switches 38-1 to 38-N respectively, primary current Ip in the primary winding of the transformer 10, and secondary currents Is1, Is2, and Is3 in the respective secondary windings 22-1 to 22-N of the transformer 10. The N cycles of the clock signal recur with a frame period T, and in this case the clock signal has a period T/3, as also shown in FIG. 2.

In a first clock cycle of the N cycles, as shown in FIG. 2 the signal S1 is high to close the switches 26-1 and 38-1, and the signals S2 and S3 are low to open the other output circuit switches. At the start of this clock cycle, at a time t0, the primary switch 14 is turned on by the PWM unit 12, and current Ip in the transformer primary winding increases linearly due to the inductance of the primary winding, energy being stored in the transformer, until a time t1. Between the times t0 and t1 the diode 24-1 is reverse biased. At the time t1, which is determined by the compensated feedback signal supplied from the circuit 36-1 via the closed switch 38-1 to the feedback line 20, the PWM unit 12 turns off the primary switch 14, so that the primary current Ip becomes zero, and the voltage of the secondary windings reverses. Consequently the diode 24-1 is forward biased via the closed switch 26-1 and current Is1 flows in the secondary winding 22-1 to increase charge of the capacitor 28-1 thereby to maintain the output voltage Vout1 at its desired regulated value.

As shown in FIG. 2 the converter operates in discontinuous current mode (DCM), the current in the diode 24-1 falling to zero at a time t2 before the next turn-on of the primary switch 14 at a time t3. Thus all of the energy stored in the transformer between the times t0 and t1 is transferred to the output circuit for the output voltage Vout1 between the times t1 and t2, the amount of energy being determined by the feedback signal for this output circuit supplied via the switch 38-1.

At the time t3 the signal S1 becomes low to open the switches 26-1 and 38-1, and the signal S2 becomes high to close switches 26-2 and 38-2 (not shown in FIG. 1) for the second output circuit. As for the first output circuit as described above, from the time t3 until a time t4 the primary switch 14 is on and the current Ip increases linearly, energy being stored in the transformer and the diode 24-2 being reverse biased during this period. At the time t4 the PWM unit 12 turns off the primary switch 14, the primary current Ip becomes zero, the voltage of the secondary windings reverses, and the diode 24-2 is forward biased via the closed switch 26-2, current Is2 flowing in the secondary winding 22-2 to maintain the output voltage Vout2 at its desired regulated value.

Again in DCM, the current in the diode 24-2 falls to zero at a time t5 before the next turn-on of the primary switch 14 at a time t6, all of the energy stored in the transformer between the times t3 and t4 being transferred to the output circuit for the output voltage Vout2 between the times t4 and t5, the amount of energy being determined by the feedback signal for this output circuit supplied via the switch 38-2.

Similarly, at the time t6 the signal S2 becomes low to open the switches 26-2 and 38-2, and the signal S3 becomes high to close the switches 26-N and 38-N for the N-th or third output circuit. As for the first and second output circuits as described above, from the time t6 until a time t7 the primary switch 14 is on and the current Ip increases linearly, energy being stored in the transformer and the diode 24-N being reverse biased during this period. At the time t7 the PWM unit 12 turns off the primary switch 14, the primary current Ip becomes zero, the voltage of the secondary windings reverses, the diode 24-N is forward biased via the closed switch 26-N and current Is3 flows in the secondary winding 22-N to maintain the output voltage VoutN at its desired regulated value.

Again in DCM, the current in the diode 24-N falls to zero at a time t8 before the next turn-on of the primary switch 14 at a time t9, all of the energy stored in the transformer between the times t6 and t7 being transferred to the output circuit for the output voltage VoutN between the times t7 and t8, the amount of energy being determined by the feedback signal for this output circuit supplied via the switch 38-N.

This sequence is repeated in subsequent switching frames or groups each of N=3 cycles of the clock signal, the situation at the time t9 corresponding to that at the time t0. The primary switch 14 is switched on and off at the frequency of the clock signal with the period T/3 in this example of N=3, and more generally with period T/N, and each of the output voltages Vout1 to VoutN is independently regulated at a frequency with the frame period T.

Figure 3:
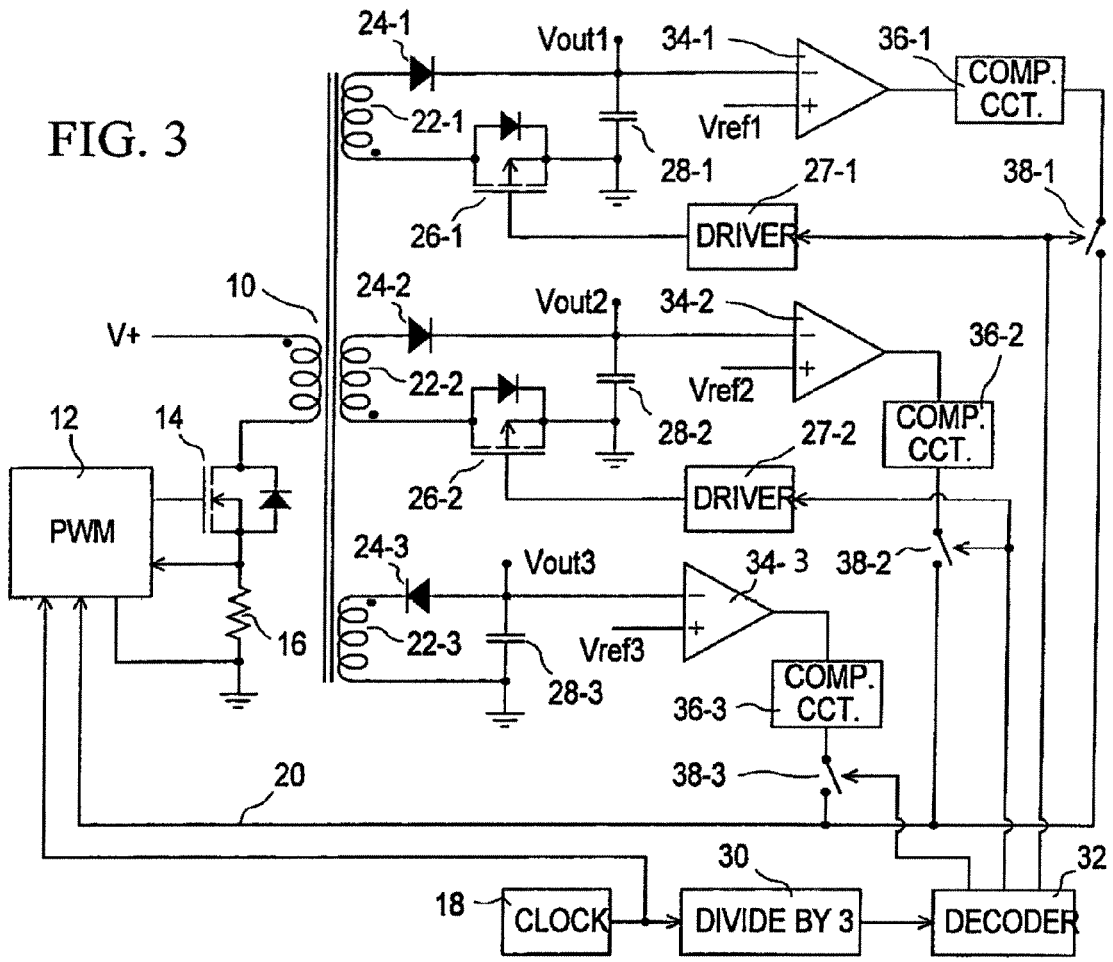
FIG. 3 schematically illustrates a multiple output flyback converter in accordance with another embodiment of this invention.

FIG. 3 illustrates a flyback converter which is similar to that of FIG. 1, except as described below.

In the flyback converter of FIG. 3, the primary switch 14 is illustrated as comprising a MOSFET also referenced 14. The converter has three output circuits respectively providing positive output voltages Vout1 and Vout2 and a negative output voltage Vout3, relative to ground or zero volts, from respective transformer secondary windings 22-1 to 22-3. The polarities of the secondary winding 22-3 and diode 24-3 of the third output circuit are reversed, relative to the polarities of the secondary windings 22-1 and 22-2 and the diodes 24-1 and 24-2, to provide the negative output voltage Vout3. It can be appreciated that this arrangement matches the polarities of the voltages VSET, VERASE, and VSCAN required for a plasma display panel (PDP) as described above, and the converter of FIG. 3 can conveniently be used for providing such output voltages, which can accordingly be individually regulated and adjusted by variation of the respective voltages Vref1 to Vref3.

In the flyback converter of FIG. 3, switches of the first and second output circuits are constituted by MOSFETs 26-1 and 26-2 and associated drivers 27-1 and 27-2 respectively. There is no switch or driver for the third output circuit, as explained below.

Referring back to the flyback converter of FIG. 1, assuming by way of example that there are two output circuits providing output voltages Vout1 of 3.3V and VoutN (N=2) of 5V, and that the forward voltage drops of the diodes 24-1 and 24-N are 0.7V, then if the secondary winding 22-1 for example has 10 turns, its output when the switch 26-1 is closed is 10/4 or 2.5 turns per volt. If the secondary winding 22-N for example also has 10 turns, then its output when the switch 26-N is closed is 10/5.7 or ~1.75 turns per volt. It can be appreciated that with these figures, during each period that the switch 26-1 of the first output circuit is closed the diode 24-N will not be forward biased even if the switch 26-N is closed; accordingly, the switch 26-N is redundant and can be omitted.

More generally, if the transformer turns ratios and output voltages are such that the voltage produced at one output circuit (that for which the secondary winding has the least turns per volt) is always clamped to a sufficiently low level, when switches of the other output circuits are turned on, such that its diode is not forward biased, then the switch for that output circuit is redundant and can be omitted.

In the flyback converter of FIG. 3, the numbers of turns of the secondary windings 22-1 to 22-3 are selected, in relation to the possible values of the output voltages Vout1 to Vout3, so that the secondary winding 22-3 always has the least turns per volt for supplying its output circuit; consequently this output circuit is permanently connected to the secondary winding 22-3 without any switch. However, this output circuit includes the switch 38-3, controlled by the decoder 32 at the respective times for the output circuit as described above.

As described above, the flyback converters of FIGS. 1 and 3 operate in DCM, with each output circuit being supplied with as much current, and hence energy, as is required by its feedback signal, the current falling to zero before the end of the T/N time period allocated for the respective output circuit in each group of N consecutive clock cycles, as shown in FIG. 2 for the case of N=3. The converters of FIGS. 1 and 3, and any of the individual output circuits of the converters, can also operate in continuous current mode (CCM) with appropriate design of the feedback control loops and/or with minimum load criteria.

Figure 4:
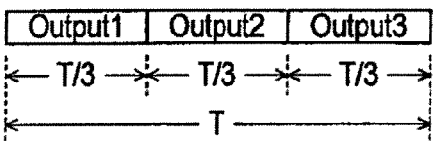
FIGS. 4 to 8 illustrate various time period assignments in operation of converters in accordance with embodiments of this invention.

FIG. 4 is a simplified diagram of the assignment of time periods to the respective outputs, corresponding to the illustration in FIG. 2 for three output circuits which are sequentially allocated respective time periods each of duration T/3 equal to one period of the clock signal. This is convenient when, for example, the power outputs of the different output circuits are approximately balanced. However, numerous other assignments of time periods to output circuits are possible and may be desirable, for example to accommodate different power levels for different output circuits, for better utilization of the transformer 10 and/or the primary switch 14, to reduce voltage and/or current stresses for the various components of the converter, and so on.

More particularly, time periods can be allocated to the output circuits in any desired manner including, but not limited to, assignments of the same or different numbers of time periods to output circuits during each frame period T, assignments of time periods of different durations to outputs during each frame period T, dynamic assignments of different numbers and/or durations of time periods to output circuits during each frame period T, and combinations of these assignments.

Some examples of such assignments are described below with reference to FIGS. 5 to 8, each of which illustrates assignments of time periods to output circuits in a similar manner to that of FIG. 4, in each case for N=3 output circuits, and it will be evident to those of ordinary skill in the art how the flyback converters of FIGS. 1 and 3 can be modified to provide these different assignments.

Figure 5:
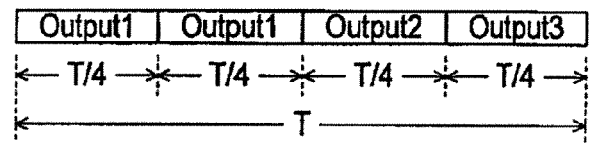
Figure 6:
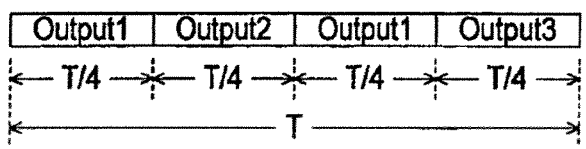
Figure 7:
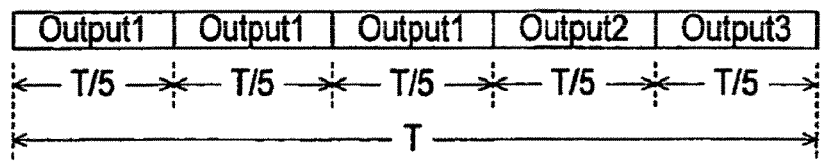

As shown in FIG. 5, the frame period T corresponds to four cycles of the clock signal each of period T/4, resulting in four time periods or time slots in each frame period T, the first two of which are allocated to the output circuit 1 and the last two of which are allocated to the outputs 2 and 3 respectively. The assignments shown by FIG. 6 are similar, except that the first and third time slots are allocated to the output 1 and the second and fourth time slots are allocated to the outputs 2 and 3 respectively. FIG. 7 similarly shows the frame period T corresponding to five cycles of the clock signal each of period T/5, the first three time slots being allocated to the output circuit 1 and the last two being allocated to the outputs 2 and 3 respectively. Assignments such as those of FIGS. 5 to 7 can be desirable when the power loads of the outputs are unbalanced, for example with the output circuit 1 having a significantly greater load than either of the output circuits 2 and 3.

Figure 8:
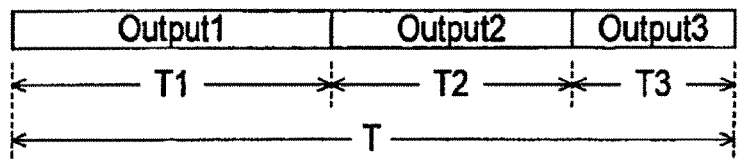

As shown in FIG. 8, time periods T1 to T3, allocated to the outputs 1 to 3 respectively and collectively forming a frame period T, need not relate to cycles of a clock signal but can be determined relatively arbitrarily, for example to match relatively arbitrary loads of the respective output circuits. It can be appreciated that, for example in a power supply arrangement for which the loads of the output circuits may vary over time, a control arrangement may be provided to vary the time periods T1 to T3 in dependence upon the varying loads. Furthermore, it can be appreciated that the total frame period T can also be varied over time.

Figure 9:
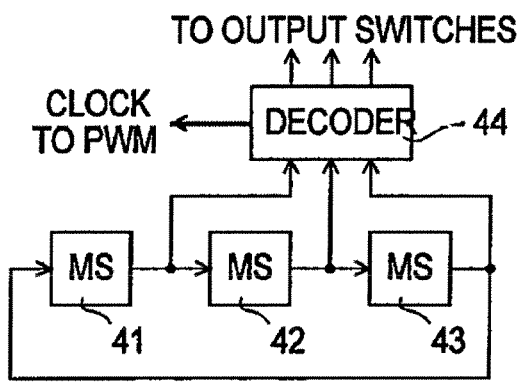
FIG. 9 schematically illustrates a modification of the flyback converters of FIGS. 1 and 3 for providing different durations of time periods assigned as shown in FIG. 8.

FIG. 9 illustrates a modification of the flyback converters of FIGS. 1 and 3 which can provide the different time periods T1 to T3 as shown in FIG. 8.

More particularly, FIG. 9 shows a ring of N=3 monostable (MS) circuits 41 to 43, for timing the periods T1 to T3 respectively, the outputs of which are coupled to inputs of a decoder 44; these replace the clock source 18, divider 30, and decoder 32 of the converter of FIG. 1 or FIG. 3. The decoder 44 has outputs for controlling the switches of the output circuits in a similar manner to that described above, and also produces a pulsed signal, for example in synchronism with this control, for supply as a clock signal to the PWM unit 12. For varying the time periods T1 to T3 as indicated above, a control arrangement responsive to the loads of the output circuits can control one or more of the monostable circuits 41 to 43 to vary the respective time periods.

In addition to the assignments of time periods as discussed above, and for better utilization of the transformer 10 and the primary switch 14, different current limit set values and/or different duty cycle limits can be assigned for the different time periods assigned to the output circuits. For example in this respect, the compensation circuits of the N output circuits can have different clamp voltages, or with additional switching different resistance values of the resistor 16 can be used for different ones of the output circuits, to provide different current limits.

As a further alternative, a number of time slots or time periods in each frame period T can be dynamically assigned to the outputs. This can improve utilization of the transformer 10 and the primary switch 14, and can improve the dynamic or transient response of the regulated outputs. This can be of particular benefit in situations where the different output loads have pulsed load characteristics with load current pulses occurring at different times for the different outputs; the loads presented by a PDP to its VSET, VERASE, and VSCAN voltage sources can be an example of such a situation.

Figure 10:
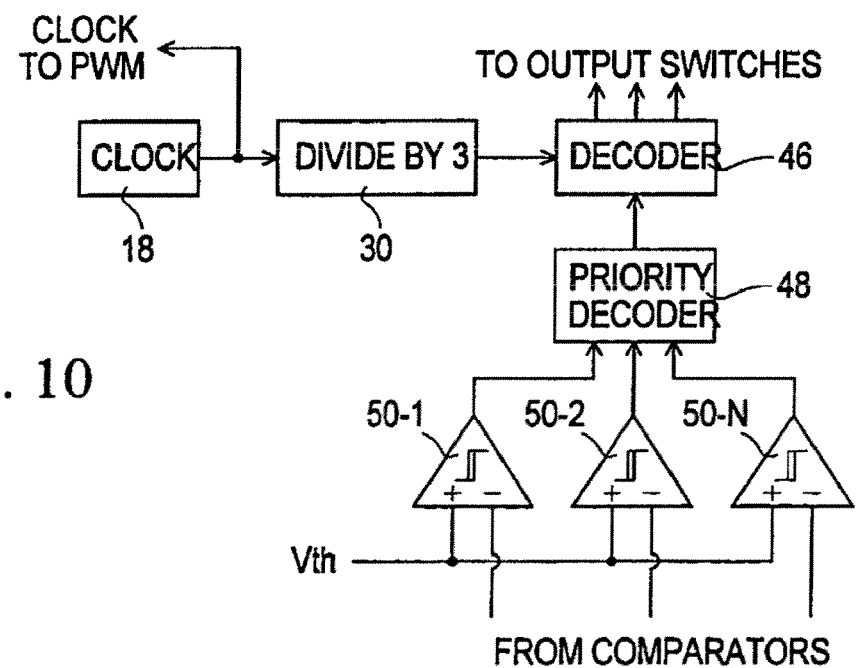
FIG. 10 schematically illustrates a modification of the flyback converters of FIGS. 1 and 3 for providing dynamic time period assignment for the multiple outputs in accordance with a further embodiment of the invention.

FIG. 10 illustrates a modification of the flyback converter of FIG. 1 or FIG. 3 for providing dynamic time period assignment for the multiple outputs. FIG. 10 shows the clock source 18 and divider 30 of the converter of FIG. 1 or FIG. 3, a decoder 46 that replaces the decoder 32 of the converter of FIG. 1 or FIG. 3, and an additional priority decoder 48 and N comparators 50-1 to 50-3 (for the case of N=3). The functions of the decoders 46 and 48 can alternatively be combined in a single decoder.

Each of the comparators 50-1 to 50-N is supplied with the output error voltage of a respective one of the comparators 34-1 to 34-N of the flyback converter of FIG. 1 or FIG. 3, and compares this with a common threshold voltage Vth to produce a logic output that is supplied to the priority decoder 48, which supplies a resulting signal to the decoder 46 for a desired dynamic assignment of time periods to the output circuits.

For example, in a normal operating mode the decoder 46 may use a pre-set assignment of time periods or time slots to the output circuits, and this may be maintained as long as the error voltages compared by the comparators 50-1 to 50-N are all below the threshold voltage Vth. If the error voltage for one or more of the output circuits is determined by the respective comparators 50-1 to 50-N to be above the threshold voltage, then the priority decoder 48 controls the decoder 46 to change the pre-set assignment, for example increasing a number of time slots assigned to this one or more of the output circuits while decreasing the number of time slots assigned to one or more other output circuits.

Other dynamic assignment processes can similarly be provided. In addition, it is observed that different threshold voltages can be used for different ones of the comparators 50-1 to 50-N, and the control arrangement can alternatively perform dynamic assignment by controlling durations of the respective time periods rather than by assigning discrete numbers of time slots for the different output circuits.

It can be appreciated that such dynamic assignment can result in cross regulation among the output voltages, because the dynamic assignment as described above increases the assignment of energy to one or more of the output circuits by decreasing the assignment to other output circuits. This may potentially be reduced by using an assignment similar to that shown by FIG. 5, for example with one time slot assigned to each of the N output circuits, and an (N+1)-th time slot in each frame period T dynamically assigned among any of the output circuits as determined by the priority decoder 48.

Figure 11:
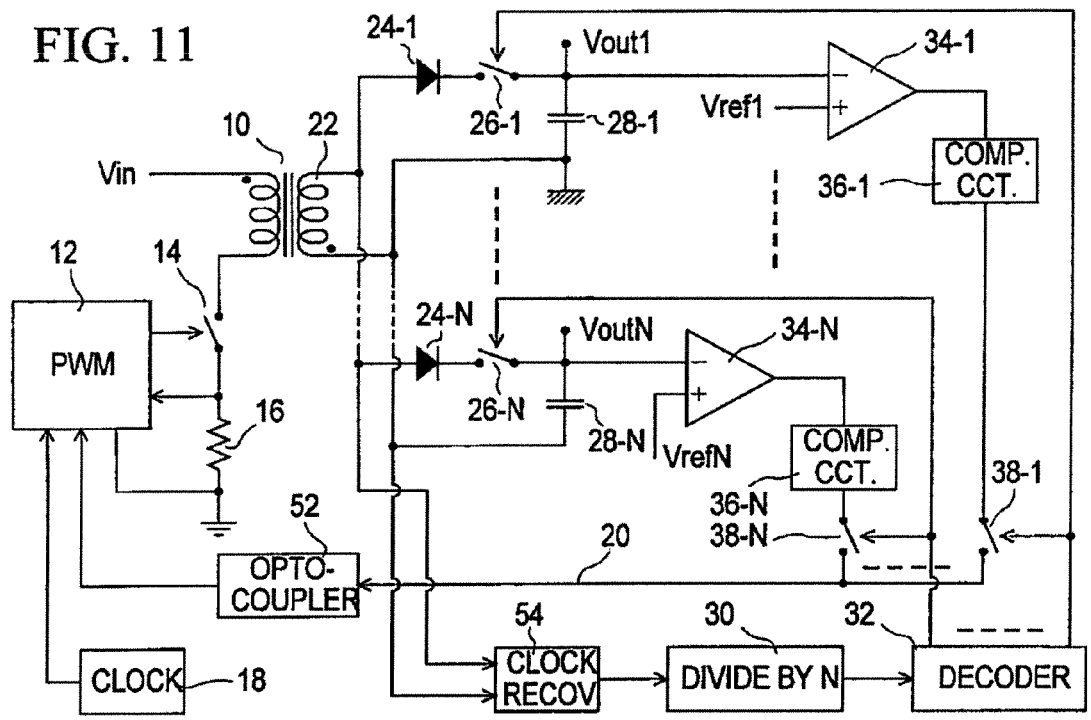
FIG. 11 schematically illustrates a modification of the flyback converter of FIG. 1, using a single secondary winding for multiple outputs, in accordance with another embodiment of the invention, and also illustrates an example of isolation of the primary and secondary sides of the converter, in accordance with a further embodiment of the invention.

Although as described above each of the N output circuits is coupled to a respective one of N secondary windings of the transformer 10, this need not be the case. For example, FIG. 11 illustrates a modification of the flyback converter of FIG. 1 in accordance with another embodiment of the invention in which all of the N output circuits, two of which are shown and possible others of which are indicated by dashed lines, are coupled to a single secondary winding 22 of the transformer 10. Except as further described below, the converter of FIG. 11 is similar to that of FIG. 1 and corresponding references are used accordingly. As also described above, again in the flyback converter of FIG. 11 one of the switches 26-1 to 26-N may be redundant and, if so, can be omitted.

More generally, DC converters in accordance with embodiments of the invention can have any number, from 1 to N, of secondary windings of the transformer 10 to each of which one or more of the N output circuits can be coupled, as may be desired in any particular circumstances.

The flyback converter of FIG. 11 also differs from that of FIG. 1 in that it provides electrical isolation of the multiple output circuits from the primary side of the converter; as shown in FIG. 11 the ground connection on the secondary or output side of the transformer 10 is different from that on the primary side.

To this end, the clock source 18 that provides the clock signal for the PWM unit 12 is provided on the primary side of the transformer 10, and the feedback signal on the line 20 is coupled to the PWM unit 12 via an opto-coupler 52 providing electrical isolation. A clock recovery circuit 54 has inputs coupled to the secondary winding 22 (in this example, or to one of a plurality of secondary windings, e.g. 22-1 to 22-N) and produces a recovered clock signal on the secondary side of the transformer 10, which is supplied to the divider 30. Electrical isolation can be provided similarly for DC converters in accordance with other embodiments of the invention.

In other embodiments of the invention, whether or not the secondary or output circuits are electrically isolated from the primary circuit, the primary and secondary circuits can each have its own timing, and in the isolated case clock recovery is not required. For example, the PWM unit 12 can have its own clock source 18 as shown in FIG. 11, and a different timing (for example using monostable circuits as described above with reference to FIG. 9) can be provided for the secondary circuits. Conceivably, the switching frequency of the PWM unit 12 can be much higher than the frequency at which the output circuits are switched, and there may be no synchronism between the frequencies used on the primary and secondary sides of the converter.

The embodiments of the invention described above are all flyback converters, but the invention is not limited to flyback converters and can be applied to other types and configurations of DC converter with multiple outputs. In particular, the invention can be applied to a single ended feed forward converter, generally referred to simply as a forward converter, for example as shown in FIG. 12.

Figure 12:
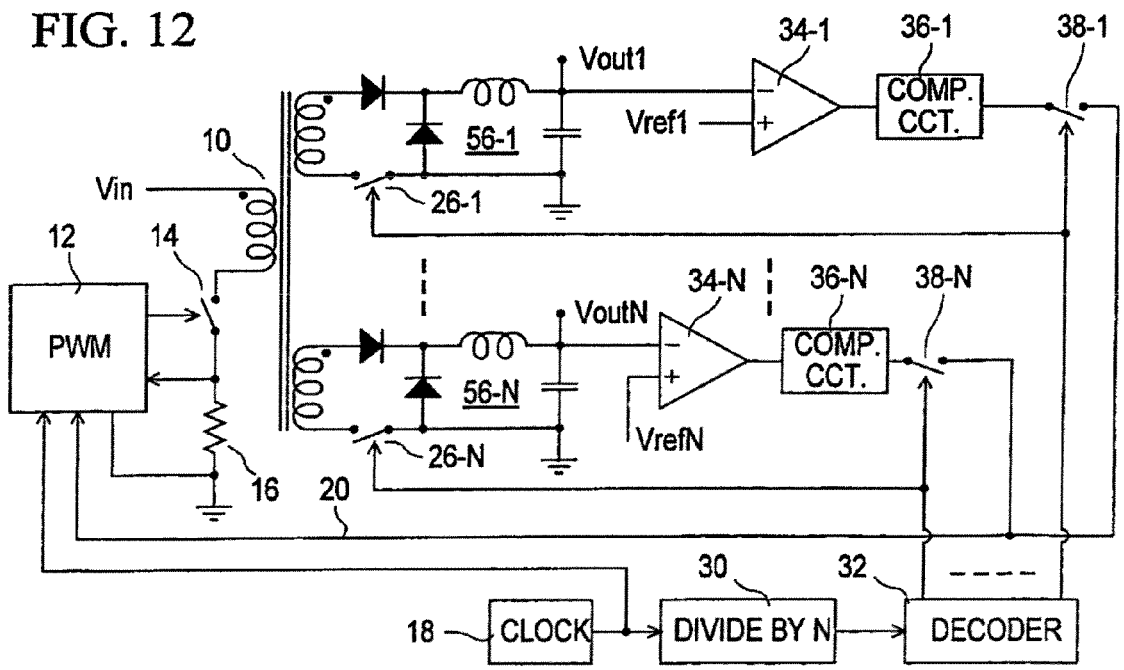
FIG. 12 schematically illustrates a multiple output forward converter in accordance with a further embodiment of the invention.

More particularly, FIG. 12 illustrates a DC converter that is similar to that of FIG. 1, and accordingly uses the same references as in FIG. 1 to denote corresponding parts, except that the multiple output circuits 56-1 to 56-N, and the senses or polarities of the secondary windings to which they are coupled via the switches 26-1 to 26-N respectively, have a forward converter configuration instead of a flyback configuration as in FIG. 1. Thus in the converter of FIG. 12 each output circuit includes two diodes, a series inductor, and an output capacitor for producing the respective one of the output voltages Vout1 to VoutN in the known configuration of a forward converter. In addition, each of the N output circuits includes a respective one of the switches 26-1 to 26-N in series with the transformer secondary winding and controlled by the decoder 32 as described above, and a respective one of the switches 38-1 to 38-N also controlled by the decoder 32 as described above for coupling the respective compensated feedback signal to the feedback line 20.

In the forward converter configuration it is desirable for each of the N output circuits to include its own switch, so that the converter includes N switches 26-1 to 26-N in addition to the primary switch 14, as shown in FIG. 12.

It can be appreciated that in any of the embodiments of the invention described above the switches 38-1 to 38-N constitute a multiplexer for supplying the feedback signals of the multiple output circuits to the feedback line 20, and these switches can be replaced by an analog signal multiplexer. It can also be appreciated that this switching or multiplexing can alternatively be carried out on the input side of the compensation circuits 36-1 to 36-N instead of the output side as shown, so that a single compensation circuit can be used in a multiplexed manner, or optionally on the input side of the error voltage amplifiers 34-1 to 34-N with suitable switching of the inputs to a common error voltage amplifier for all of the output circuits.

It can be appreciated from the above description that DC converters in accordance with embodiments of the invention can be particularly well suited to providing regulated high voltages required by PDPs, enabling them to be independently varied and regulated as may be required within relatively wide ranges, in a cost-effective manner. However, the invention is not limited to this application, and can be used generally where it may be required to provide a DC converter with a plurality of independently controlled or regulated output voltages.

As discussed above, operation of a converter in accordance with an embodiment of the invention in DCM in particular ensures that the output voltages can be regulated completely independently of one another, without limitations such as for minimum loads, fixed output voltages, and specific output voltage ratios, and without any need for additional PWM controllers for the output circuits, as is required with the known post-regulation techniques. In addition, whereas such known techniques involve switching losses, in embodiments of the invention as described above the switches 26-1 to 26-N which couple the output circuits to the secondary winding(s) of the transformer can be turned on and off at substantially zero current, so that switching losses are avoided or reduced.

It is also observed that these switches can have relatively arbitrary positions in series with the secondary windings to which they are coupled. For example, the switch 26-1 can be connected between the diode 24-1 and the output capacitor 28-1 as shown in FIG. 1, or between the secondary winding 22-1 and the diode 24-1 (which can be connected on either side of the winding 22-1), or between the winding 22-1 (or the diode 24-1 connected on the ground side of this winding) and ground as shown in FIG. 3. The connection as shown in FIG. 3 facilitates a simple drive arrangement for the switch when it is constituted by a MOSFET as illustrated in FIG. 3. In any event, the switch of the respective output circuit is connected in series with the respective secondary winding of the transformer, thereby coupling the output circuit to the secondary winding when the switch is closed.

Although in the embodiments of the invention described above the unit 12 for controlling the primary switch is a PWM control unit, it can be appreciated that such a control unit is not limited to PWM control and can instead be of any other desired form.

Thus although particular embodiments of the invention are described above by way of example, it can be appreciated that these and numerous other modifications, variations, and adaptations may be made without departing from the scope of the invention as defined in the claims.

The invention claimed is:

1. Apparatus for producing N output voltages, where N is an integer greater than one, comprising:
   means for coupling a single primary circuit of a DC converter to each of N output circuits of the DC converter in respective time periods, the output circuits each producing a respective one of the N output voltages; and
   means for coupling a respective feedback signal of each of the output circuits as a feedback control signal to the primary circuit of the DC converter during the respective time periods for regulating each output voltage substantially independently of each other output voltage.

2. Apparatus as claimed in claim 1 wherein the DC converter is operated in discontinuous current mode for producing each of the N output voltages.

3. Apparatus as claimed in claim 1 wherein the DC converter is a forward converter.

4. Apparatus as claimed in claim 1 wherein the DC converter is a flyback converter.

5. Apparatus as claimed in claim 1 wherein the means for coupling the primary circuit to each of the N output circuits in respective time periods comprises means for selectively switching each of at least N-1 of the output circuits to couple it to a secondary winding of a transformer of the DC converter.

6. Apparatus as claimed in claim 1 and comprising means for producing the respective time periods sequentially and cyclically for the N output circuits.

7. Apparatus as claimed in claim 6 and including means for producing the respective time periods equally for the N output circuits.

8. Apparatus as claimed in claim 6 and including means for producing the respective time periods with different durations for different ones of the N output circuits.

9. Apparatus as claimed in claim 6 and including means for producing the respective time periods with durations dependent upon error voltages of the output circuits.

* * * * *